(12) United States Patent
Umezu et al.

(10) Patent No.: US 7,968,176 B2
(45) Date of Patent: Jun. 28, 2011

(54) AIR FILTER MATERIAL

(75) Inventors: Norio Umezu, Saitama (JP); Kazumasa Mizui, Saitama (JP)

(73) Assignee: Dynic Corporation, Kyoto-shi (JP)

( * ) Notice: Subject to any disclaimer, the term of this patent is extended or adjusted under 35 U.S.C. 154(b) by 909 days.

(21) Appl. No.: 11/822,110

(22) Filed: Jul. 2, 2007

(65) Prior Publication Data

US 2008/0070022 A1    Mar. 20, 2008

(51) Int. Cl.
*B32B 5/06*    (2006.01)

(52) U.S. Cl. ........ 428/219; 428/220; 442/387; 442/388; 442/402; 55/527; 55/528

(58) Field of Classification Search .......... 442/387, 442/388; 428/219, 220; 55/527, 528
See application file for complete search history.

(56) References Cited

U.S. PATENT DOCUMENTS

| | | | | |
|---|---|---|---|---|
| 5,198,294 | A * | 3/1993 | Masuda et al. | 442/388 |
| 6,746,517 | B2 * | 6/2004 | Benson et al. | 95/273 |
| 2003/0046913 | A1 | 3/2003 | Suzuki et al. | |
| 2003/0222014 | A1 * | 12/2003 | Nakajima | 210/490 |
| 2004/0083697 | A1 * | 5/2004 | Niakin | 55/486 |

FOREIGN PATENT DOCUMENTS

| | | |
|---|---|---|
| CA | 2 379 499 A1 | 11/2001 |
| CN | 1463785 | 12/2003 |
| DE | 101 92 116 T1 | 10/2002 |
| EP | 1 378 283 A1 | 1/2004 |
| GB | 2 368 298 A | 5/2002 |
| JP | A 62-279817 | 12/1987 |
| JP | A 4-27403 | 1/1992 |
| JP | A 4-27404 | 1/1992 |
| JP | A 4-193316 | 7/1992 |
| JP | A 5-49825 | 3/1993 |
| JP | A 8-24535 | 1/1996 |
| JP | A 8-192016 | 7/1996 |
| JP | A 10-337426 | 12/1998 |
| JP | A 2002-15624 | 1/2002 |
| JP | A 2002-45624 | 2/2002 |
| JP | A 2003-340220 | 12/2003 |
| JP | A 2004-243250 | 9/2004 |
| WO | WO 01/89662 A1 | 11/2001 |

OTHER PUBLICATIONS

"Japanese Industrial Standard: Test Methods of Air Cleaners for Automobiles," JIS D 1612, *Japanese Standards Association*, pp. 21-45, 1989.

* cited by examiner

*Primary Examiner* — Elizabeth M Cole
(74) *Attorney, Agent, or Firm* — Oliff & Berridge, PLC

(57) ABSTRACT

An air filter material includes a laminate of an air inlet layer and an air outlet layer, and has a mean flow pore size of 20 μm to 40 μm, a minimum pore size of 2.4 μm to 3.8 μm, and a maximum pore size of 80 μm or less. The air inlet layer is a needle punched nonwoven fabric layer having an areal fiber weight of 55 g/m² to 100 g/m². The air outlet layer is a laminated spunlace nonwoven fabric made by laminating at least two or more spunlace nonwoven fabric layers having an areal fiber weight of 20 g/m² to 60 g/m², a mean flow pore size of 50 μm to 90 μm, a minimum pore size of 3.0 μm to 10.0 μm, and a maximum pore size of 180 μm or less.

9 Claims, 2 Drawing Sheets

[FIG. 1]
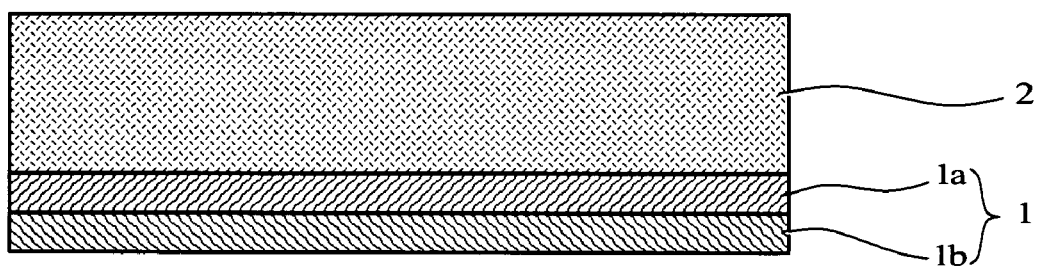
[FIG. 2]
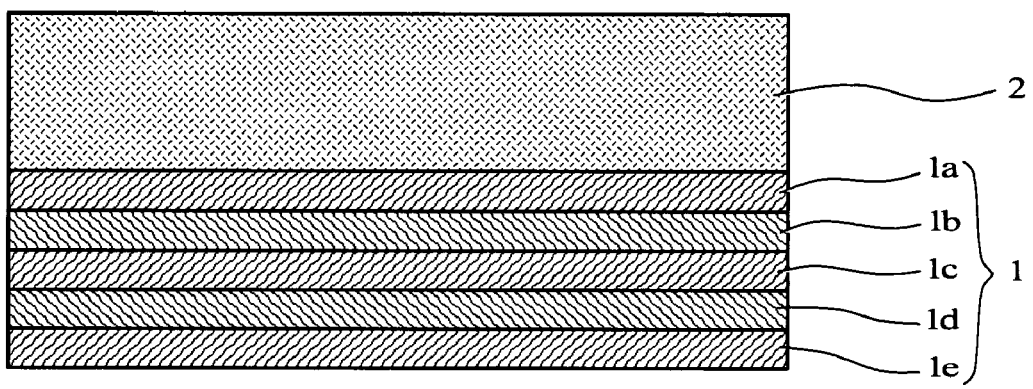

[FIG. 3A]
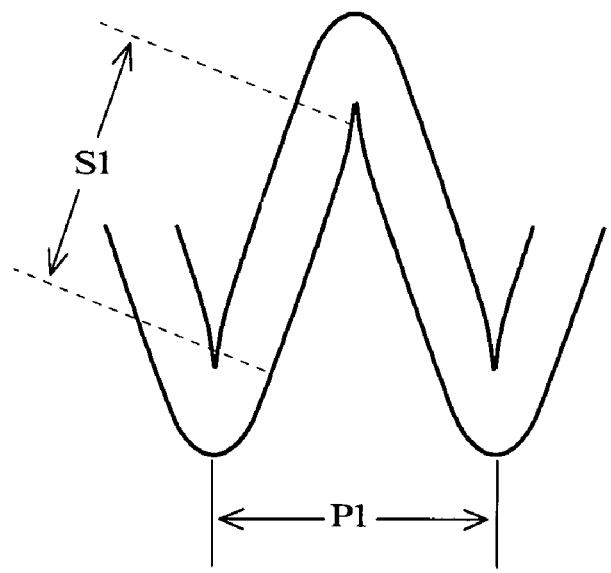
[FIG. 3B]
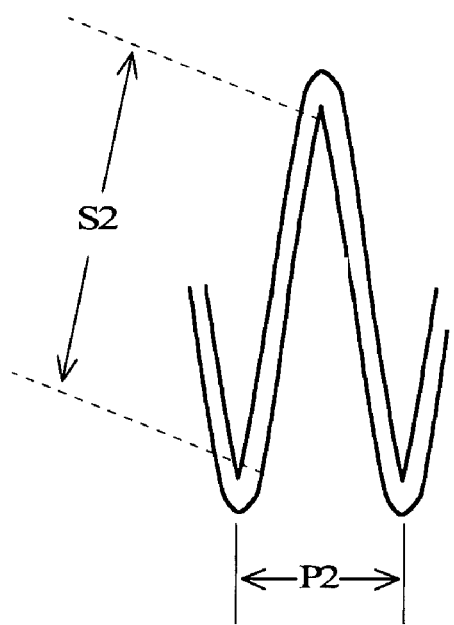

AIR FILTER MATERIAL

This application is a Continuation-in-Part of application PCT/JP2006/318291 filed on Sep. 14, 2006. The entire disclosure of the prior application is hereby incorporated by reference in its entirety.

BACKGROUND OF THE INVENTION

1. Field of the Invention

The present invention relates to an air filter material to be used in an air cleaner for various types of internal combustion engines that run on gasoline, ethanol, light oil, heavy oil, or other fuels, including four-stroke or two-stroke reciprocating engines, rotary engines, and gas turbine engines. In particular, the present invention relates to an air filter material intended for engines of automotive vehicles (such as a motorcycle and a four-wheel car), which has excellent capabilities to collect carbon soot as well as to collect sand and other dusts (see JIS D-1612) and is further capable of suppressing a dust penetration phenomenon which tends to occur under particular conditions.

2. Description of the Related Art

If dust-containing air is introduced into cylinders of automobile engines, there can occur the problem of damaging the inner walls of the cylinders and causing an engine failure. Thus, it has heretofore been absolutely necessary for the air filter materials of automobile air cleaners to exhibit a favorable dust collection capability. Moreover, when the introduced air is contaminated with carbon soot discharged from diesel engines and the like, sensors for measuring the appropriate flow quantity of air relative to fuel may sometimes malfunction. Thus, the air filter materials of the air cleaners for automobile engines have also been required to exhibit a favorable carbon soot collection capability.

As an air filter material that exhibits a favorable dust collection capability and carbon soot collection capability, an air cleaner filter medium comprising a dense fiber layer and an adjacent fiber layer adjacent thereto has been proposed (see Japanese Patent Application Laid-Open No. Hei 10-337426). Here, the dense fiber layer is a nonwoven fabric made of fine fibers having an average fiber diameter of 3 µm to 15 µm, with an areal density of 20 $g/m^2$ to 120 $g/m^2$. The adjacent fiber layer has an apparent density of 0.1 $g/cm^3$ to 0.2 $g/cm^3$ and an areal density of 10 $g/cm^2$ to 100 $g/m^2$.

A new problem was found, however, that if a large amount of dust is held on an automobile engine air cleaner that uses the air cleaner filter medium described in Japanese Patent Application Laid-Open No. Hei 10-337426 when the engine is driven, the automobile engine air cleaner also changes in the frequency of vibration according to the number of revolutions of the engine and causes such a phenomenon that the dust collected by the air cleaner filter medium penetrates to the air outlet side (dust penetration) around 200 Hz in the frequency of vibration.

For this problem, it seems to be effective to impregnate the air cleaner filter medium with acrylate emulsions or the like, followed by drying so that the fibers constituting the nonwoven fabric are fixed with the resin. If the amount of resin applied increases, however, there can occur the problem that an intended rate of air flow cannot be obtained because the carbon soot collection capability drops and the air cleaner filter medium clogs up with dust.

As above, it has been impossible to maintain the dust collection capability, the dust penetration resistance, and the carbon soot collection capability of a nonwoven-based air filter material, such as the air cleaner filter medium described in Japanese Patent Application Laid-Open No. Hei 10-337426, in a well-balanced manner at high level.

Then, in order to provide an air filter material with a favorable dust collection capability, dust penetration resistance, and carbon soot collection capability in a well-balanced manner, it has been proposed to configure the air filter material as a laminate of three layers of nonwoven fabrics while confining each of the nonwoven fabrics to predetermined ranges in average fiber diameter, areal fiber weight, apparent density, and the amount of resin impregnated (see Japanese Patent Application Laid-Open No. 2004-243250). Specifically, an air filter material formed by laminating a first nonwoven fabric made of fibers having an average fiber diameter of 3 µm to 5 µm, a second nonwoven fabric made of fibers having an average fiber diameter of 9 µm to 15 µm, and a third nonwoven fabric made of fibers having an average fiber diameter of 16 µm to 32 µm has been proposed. Here, the first nonwoven fabric is 35 $g/m^2$ to 55 $g/m^2$ in areal fiber weight, 10 $g/m^2$ to 24 $g/m^2$ in the amount of binder resin applied, and 0.16 $g/cm^3$ to 0.30 $g/cm^3$ in apparent density. The second nonwoven fabric is 20 $g/m^2$ to 100 $g/m^2$ in areal fiber weight, 4 $g/m^2$ to 11 $g/m^2$ in the amount of binder resin applied, and 0.10 $g/cm^3$ to 0.20 $g/cm^3$ in apparent density. Then, the third nonwoven fabric is 55 $g/m^2$ to 100 $g/m^2$ in areal fiber weight, 1 $g/m^2$ to 5 $g/m^2$ in the amount of binder resin applied, and 0.073 $g/cm^3$ to 0.088 $g/cm^3$ in apparent density. Concerning this air filter material, it is mentioned that the first nonwoven fabric is preferably made of splittable staple fibers while spunlace nonwoven fabrics are used as the first and second nonwoven fabrics.

In order for the air filter material of Japanese Patent Application Laid-Open No. 2004-243250 to secure desirable levels of dust penetration resistance, dust collection capability, and carbon soot collection capability, however, the first nonwoven fabric layer must be made of expensive splittable fibers as disclosed in the working Examples thereof. This has resulted in an increase in manufacturing cost. In addition to this, air filter materials have required excellent initial cleaning efficiencies and lives against dust and carbon soot as basic capabilities.

SUMMARY OF THE INVENTION

To solve the foregoing problems of the conventional technology, it is an object of the present invention to provide a low-cost, nonwoven-based air filter material which exhibits dust penetration resistance, small initial flow resistance, and such capabilities as initial cleaning efficiencies and lives against dust and carbon soot in a well-balanced manner without using splittable fibers.

In order to provide an air filter material with excellent dust penetration resistance, initial flow resistance, and such capabilities as initial cleaning efficiencies and lives against dust and carbon soot in a well-balanced manner, the inventors have configured the air filter material as a laminate of a layer on the air inlet side (hereinafter, referred to as air inlet layer) and a layer on the air outlet side (hereinafter, referred to as air outlet layer), wherein the air inlet layer is made of a needle punched nonwoven fabric layer having an areal fiber weight confined to a predetermined range, and the air outlet layer is made of a laminate of two or more spunlace nonwoven fabric layers. They have also found that the foregoing object can be achieved by employing "mean flow pore size," "minimum pore size," and "maximum pore size" based on ASTM F-316-80 as the indexes for specifying each individual spunlace nonwoven layer, instead of "the amount of binder resin applied" and "apparent density" in Japanese Patent Application Laid-Open No. 2004-243250, and by confining those values of the air filter material and those values of each of the spunlace nonwoven fabric layers constituting the same to respective predetermined ranges, and have thus accomplished the present invention.

More specifically, the present invention provides an air filter material comprising a laminate of an air inlet layer and an air outlet layer, having a mean flow pore size of 20 µm to 40 µm, a minimum pore size of 2.4 µm to 3.8 µm, and a maximum pore size of 80 µm or less, and wherein: the air inlet layer is a needle punched nonwoven fabric layer having an areal fiber weight of 55 g/m² to 100 g/m²; and the air outlet layer is a laminated spunlace nonwoven fabric formed by laminating at least two or more spunlace nonwoven fabric layers having an areal fiber weight of 20 g/m² to 60 g/m², a mean flow pore size of 50 µm to 90 µm, a minimum pore size of 3.0 µm to 10.0 µm, and a maximum pore size of 180 µm or less.

The present invention also provides an air cleaner for an automobile engine, using the foregoing filter material as its filter element.

The air filter material of the present invention has its own "mean flow pore size", "minimum pore size", and "maximum pore size" confined with predetermined ranges. In addition to this, a needle punched nonwoven fabric layer having its areal fiber weight confined to a predetermined range is used as the air inlet layer. Furthermore, a laminate of at least two or more spunlace nonwoven fabric layers having "areal fiber weights", "mean flow pore sizes", "minimum pore sizes", and "maximum pore sizes" confined within respective predetermined ranges is used as the air outlet layer. Consequently, dust penetration resistance and capabilities such as initial cleaning efficiencies and lives against dust and carbon soot are provided in a well-balanced manner without the use of expensive splittable fibers.

BRIEF DESCRIPTION OF THE DRAWINGS

FIG. 1 is a cross-sectional view of an air filter material according to the present invention;

FIG. 2 is a cross-sectional view of an air filter material according to the present invention;

FIG. 3A is a partial enlarged view of a folded air filter material; and

FIG. 3B is a partial enlarged view of a folded air filter material.

DETAILED DESCRIPTION OF THE PREFERRED EMBODIMENTS

Hereinafter, the present invention will be described in detail with reference to the drawings.

FIG. 1 is a cross-sectional view of an example of embodiments of the air filter material according to the present invention. This air filter material has such a structure that an air outlet layer 1 is arranged on the air outlet side and an air inlet layer 2 is arranged on the air inlet side. Here, the air filter material itself has a mean flow pore size of 20 µm to 40 µm, and preferably 25 µm to 35 µm. The reason is that the air flow resistance increases and the life decreases if the mean flow pore size falls below 20 µm, and the initial cleaning efficiency drops if the mean flow pore size exceeds 40 µm. The air filter material itself also has a minimum pore size of 2.4 µm to 3.8 µm, and preferably 2.8 µm to 3.4 µm. The reason is that the air flow resistance increases and the life decreases if the minimum pore size falls below 2.4 µm, and the initial cleaning efficiency drops if the minimum pore size exceeds 3.8 µm.

The air filter material further has a maximum pore size of 80 µm or less, and preferably 73 µm or less. The reason is that the initial cleaning efficiency drops if the maximum pore size exceeds 80 µm.

Now, the air outlet layer 1 is a laminated spunlace nonwoven fabric made of spunlace nonwoven fabric layers 1a and 1b. In the embodiment of FIG. 1, the air outlet layer 1 is composed of the two spunlace nonwoven fabric layers 1a and 1b, whereas it may be made of three or more spunlace nonwoven fabric layers. For example, as shown in FIG. 2, the air outlet layer 1 may be made of five spunlace nonwoven fabric layers 1a to 1e.

In the air filter material of the present invention, as shown in FIG. 1, the air outlet layer 1 and the air inlet layer 2 are preferably laminated in direct contact with each other in view of preventing dust permeation by collecting dust at the surface layer without permeation to inside the air filter material.

In the present invention, each of the spunlace nonwoven fabric layers 1a to 1e is a spunlace nonwoven fabric which is fabricated by hydroentangling a fiber web created by a dry method or wet method such as a carding method and an air-laid method, and is a layer for improving initial collection efficiencies chiefly against sand and other dusts (see JIS D-1612) and carbon soot.

As will be described below, the spunlace nonwoven layers 1a to 1e which constitute the air outlet layer 1 can be specified by: an "areal fiber weight" which provides an index of lamination at a certain fiber density; a "mean flow pore size" which provides an index of average fiber density; a "minimum pore size" which provides an index of unevenness at high-density portions of fiber; and a "maximum pore size" which provides an index of unevenness at low-density portions of fiber. It should be appreciated that these can be measured based on ASTM F-316-80.

Each of the spunlace nonwoven fabric layers 1a to 1e which constitute the air outlet layer 1 has an "areal fiber weight" of 20 g/m² to 60 g/m², and preferably 30 g/m² to 40 g/m². The reason is that the certain fiber density becomes insufficient if the areal fiber weight falls below 20 g/m², while one single layer can contribute so excessively that the filter life decreases and the entire air filter material gets out of balance if the areal fiber weight exceeds 60 g/m².

Each of the spunlace nonwoven fabric layers 1a to 1e which constitute the air outlet layer 1 has a "mean flow pore size" of 50 µm to 90 µm, and preferably 50 µm to 75 µm. The reason is that the amount of air flow becomes insufficient if the mean flow pore size falls below 50 µm, while the dust collection capability drops to cause dust permeation if the means flow pore size exceeds 90 µm.

Each of the spunlace nonwoven fabric layers 1a to 1e which constitute the air outlet layer 1 has a "minimum pore size" of 3.0 µm to 10.0 µm, and preferably 4.0 µm to 8.0 µm. The reason is that the amount of air flow becomes insufficient if the minimum pore size falls below 3.0 µm, while the dust collection capability drops to cause dust permeation if the minimum pore size exceeds 10.0 µm.

Moreover, each of the spunlace nonwoven fabric layers 1a to 1e which constitute the air outlet layer 1 has a "maximum pore size" of 180 µm or less, and preferably 150 µm or less. The reason is that the dust collection capability drops to cause dust permeation if the maximum pore size exceeds 180 µm.

If each of the spunlace nonwoven fabric layers 1a to 1e which constitute the air outlet layer 1 has too large a thickness, the folding pitch P1 of the air filter material, as shown in FIG. 3A, inevitably becomes greater than the folding pitch P2 of a thin air filter material shown in FIG. 3B when the air filter material is folded to make an air filter element. This precludes the air filter element from providing a large filter surface area. Besides, the substantial filtering area S1 of one slope of the air filter material in FIG. 3A inevitably becomes smaller than the substantial filtering area S2 in FIG. 3B, so that the filtering capability drops more than the decrease in the number of foldings. Too small a thickness might in turn cause the problem of a decrease in filter life. Consequently, each of the spunlace nonwoven fabric layers 1a to 1e which constitute the air outlet layer 1 according to the present invention preferably has a thickness of 0.3 mm to 0.5 mm, and yet preferably 0.3 mm to 0.4 mm.

The fiber that makes the spunlace nonwoven fabric layers 1a to 1e of the air outlet layer 1 preferably has a diameter of 0.6 dT to 1.6 dT because the air flow resistance increases if it is too thin, and the density becomes insufficient if too thick. Two or more fibers having different fiber diameters may be mixed for use in arbitrary proportions.

Materials available for the fiber that makes the spunlace nonwoven fabric layers 1a to 1e of the air outlet layer 1 include synthetic fibers such as polyamide fibers, polyvinyl alcohol fibers, polyvinylidene chloride fibers, polyvinyl chloride fibers, polyester fibers, polyacrylonitrile fibers, polyethylene, polypropylene, and other polyolefin fibers, and polyurethane fibers. Two ore more types of these synthetic fibers may be used together. Of these, polyester fiber can be used favorably in terms of cost and heat resistance.

The air outlet layer 1 can be created by stacking individual spunlace nonwoven fabric layers that are prefabricated as nonwoven fabric, and laminating the same by a publicly known lamination method (needle punching, hot melt adhesion, hydroentangling, or the like). It can also be created by stacking fiber webs corresponding to respective spunlace nonwoven fabric layers, and fabricating and laminating them into nonwoven fabric simultaneously by hydroentangling.

The air inlet layer 2 which constitutes the air filter material of the present invention is a needle punched nonwoven fabric which is fabricated as nonwoven fabric by needle-punching a fiber web made by a dry method or wet method such as a carding method and an air-laid method. It is a layer intended to enhance the effect for increasing the dust collection capacity of the air filter material without decreasing the initial collection efficiencies of the air outlet layer 1 against sand and other dusts (see JIS D-1612) and carbon soot.

The air inlet layer 2 has an areal fiber weight of 55 g/m$^2$ to 100 g/m$^2$, and preferably 65 g/m$^2$ to 90 g/m$^2$. The filter life unfavorably tends to be short if the areal fiber weights falls below 55 g/m$^2$, while the volume tends to be nonuniform if the areal fiber weights exceeds 100 g/m$^2$. Moreover, the fiber in use preferably has a thickness of 2.2 dT to 11.0 dT, and yet preferably 3.3 dT to 6.7 dT, because it may have an excessive density if too thin, and may have an insufficient density and thus an excessive volume if too thick. Two or more fibers having different fiber diameters may be used.

The types of fibers available to make the air inlet layer 2 are the same as those used for the air outlet layer 1. In addition, regenerated fibers such as rayon fiber and cupra fiber, semi-synthetic fibers such as acetate fiber, inorganic fibers such as carbon fiber, plant fibers such as cotton and hemp, and animal fibers such as wool, and the like may also be used. The fiber that makes the air inlet layer 2 may also be an ordinary staple fiber having fiber lengths of 32 mm to 75 mm or so.

The air inlet layer 2 preferably has a thickness of 0.5 mm to 0.9 mm, and yet preferably 0.6 mm to 0.8 mm, because it may lack the amount of dust collection if too thin, and may have an excessive structural resistance and thus result in an insufficient number of foldings if too thick.

The air inlet layer 2 can be created by needle-punching a corresponding fiber web into nonwoven fabric.

For the purpose of adjustment in thickness, the air filter material of the present invention may interpose a spunlace intermediate layer, having an areal fiber weight of preferably 30 g/m$^2$ to 60 g/m$^2$, a mean flow pore size of preferably 70 μm to 120 μm, a minimum pore size of preferably 9 μm to 15 μm, and a maximum pore size of preferably 200 μm or less, between the air outlet layer 1 and the air inlet layer 2 in FIGS. 1 and 2.

The fiber to make such a spunlace intermediate layer preferably has a diameter of 1.6 dT to 3.3 dT because it may have an excessive air flow resistance if the diameter is too small, and may have an excessive layer thickness if too large. Two or more fibers having different fiber diameters may be used.

Materials available for the fiber that makes the spunlace intermediate layer include synthetic fibers such as polyamide fibers, polyvinyl alcohol fibers, polyvinylidene chloride fibers, polyvinyl chloride fibers, polyester fibers, polyacrylonitrile fibers, polyethylene, polypropylene, and other polyolefin fibers, and polyurethane fibers. Two ore more types of these synthetic fibers may be used together. Of these, polyester fiber can be used favorably in terms of cost and heat resistance.

For the purpose of improving the surface filtering capability further, the air filter material of the present invention may interpose a cotton layer having an areal fiber weight of preferably 20 g/m$^2$ to 60 g/m$^2$ between the air outlet layer 1 and the air inlet layer 2, or between any two of the plurality of spunlace layers that constitute the air outlet layer 1. The cotton layer also preferably has an areal fiber weight of 30 g/m$^2$ to 40 g/m$^2$, a mean flow pore size of preferably 50 μm to 80 μm, a minimum pore size of preferably 4 μm to 8 μm, and a maximum pore size of preferably 150 μm or less. Viscous oil for enhancing the carbon soot collection capability may be applied to the surface of the air inlet side of the air filter material having such a cotton layer.

A binder resin may be applied to the air filter material of the present invention. The amount of application is preferably 15 g/m$^2$ to 60 g/m$^2$, and yet preferably 20 g/m$^2$ to 50 g/m$^2$, because a stable pleats cannot be formed if the amount is too small, and the dust collection capability drops if too large. Note that only a relatively small proportion of the applied binder resin is retained inside the fibers that constitute the nonwoven fabrics, and most of it adheres to the surfaces of the fibers that constitute the nonwoven fabrics, or to the boundary surfaces between the nonwoven-constituting fibers in particular.

Examples of binder resins available include thermosetting resins such as water-soluble phenol resin and epoxy resin, polyacrylic acid ester resin emulsions, polyacryl-styrene resin emulsions, and polyvinyl acetate resin emulsions. In particular, polyacrylic acid ester resin emulsions and polyacryl-styrene resin emulsions can be suitably used since they can adjust the texture of the air filter material easily. Publicly known techniques such as impregnation, spraying, and application may be used to apply such binder resins.

The air filter material of the present invention can be manufactured, for example, by: stacking a fiber web that makes a spunlace layer on a fiber web that makes another spunlace layer; treating the laminate of the fiber webs by hydroentangling, thereby fabricating respective pieces of nonwoven fabric and causing fiber entanglement therebetween for lamination; placing an air inlet layer that is prefabricated as nonwoven fabric by the needle punching process (needle punched nonwoven fabric) on the resulting air outlet layer; and performing needle punching from the air outlet layer side for lamination and integration. It may also be impregnated with a binder resin to a predetermined amount of application by an immersion method if necessary.

Otherwise, it may be manufactured by laminating and integrating an air inlet layer and two spunlace layers that have been separately fabricated as nonwoven fabrics and impregnated with respective binder resins, if necessary, by using a publicly known lamination method (for example, through the use of an adhesive (a hot melt adhesive, a solvent type adhesive, or the like)).

The air filter material of the present invention described so far can be suitably used as a filter element of a publicly known automobile air cleaner (for example, FIGS. 1 and 2 of Japanese Patent Application Laid-Open No. Hei 4-27404), keeping in mind that the air outlet layer be arranged on the air outlet side for use.

EXAMPLE

Hereinafter, the present invention will be described in conjunction with the following Examples. It should be noted that the values of the "mean flow pore size", "minimum pore size", and "maximum pore size" in the following Examples and Comparative Examples are averages of four measurements according to ASTM F-316-80.

Example 1

(1a) Initially, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 63.7 μm,
"minimum pore size": 7.1 μm, and
"maximum pore size": 144.6 μm.
(1b) Next, a carded web (60 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size", a "minimum pore size", and a "maximum pore size" as follows:
"mean flow pore size": 48.8 μm,
"minimum pore size": 7.9 μm, and
"maximum pore size": 97.6 μm.
(1c) A carded web (85 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into needle punched nonwoven fabric as an air inlet layer sheet by needle punching.
(1d) Two pieces of the spunlace nonwoven fabric obtained in the foregoing step (1a) were stacked, and the spunlace nonwoven fabric of the foregoing step (1b) was further stacked thereon to form an air outlet layer sheet. The air inlet layer sheet of the foregoing step (1c) was further laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 1.85 mm in thickness and 245 g/m² in weight, and had a "mean flow pore size," a "minimum pore size," and a "maximum pore size" as follows:
"mean flow pore size": 32.3 μm,
"minimum pore size": 2.8 μm, and
"maximum pore size": 73.0 μm.

Example 2

A carded web (75 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet. Except the use of this air inlet layer sheet, the same operations as in example 1 were repeated to obtain an air filter material. The resulting air filter material was 1.70 mm in thickness and 230 g/m² in weight, and had a "mean flow pore size," a "minimum pore size," and a "maximum pore size" as follows:
"mean flow pore size": 35.1 μm,
"minimum pore size": 3.7 μm, and
"maximum pore size": 69.9 μm.

Example 3

(3a) Initially, a carded web (30 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 94.4 μm,
"minimum pore size": 6.2 μm, and
"maximum pore size": 178.0 μm.
(3b) A carded web (70 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet.
(3c) Five pieces of the spunlace nonwoven fabric of the foregoing step (3a) were stacked to form an air outlet layer sheet, and the air inlet layer sheet of the foregoing step (3b) was laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 1.9 mm in thickness and 260 g/m² in weight, and had a "mean flow pore size," a "minimum pore size," and a "maximum pore size" as follows:
"mean flow pore size": 33.7 μm,
"minimum pore size": 3.6 μm, and
"maximum pore size": 71.1 μm.

Example 4

(4a) Initially, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 63.7 μm,
"minimum pore size": 7.1 μm, and
"maximum pore size": 144.6 μm.

(4b) A carded web (70 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet.

(4c) Four pieces of the spunlace nonwoven fabric of the foregoing step (4a) were stacked to form an air outlet layer sheet, and the air inlet layer sheet of the foregoing step (4b) was laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 50 g/m² in dry weight, and dried to obtain an air filter material. The resulting air filter material was 1.5 mm in thickness and 240 g/m² in weight, and had a "mean flow pore size," a "minimum pore size," and a "maximum pore size" as follows:
"mean flow pore size": 28.6 μm,
"minimum pore size": 3.2 μm, and
"maximum pore size": 64.4 μm.

Example 5

(5a) Initially, a carded web (30 g/m² in areal fiber weight) containing 50 parts by weight of 0.9-dT polyester staple (51 mm in length, from Teijin Fiber Co., Ltd.) and 50 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 54.3 μm,
"minimum pore size": 6.6 μm, and
"maximum pore size": 122.3 μm.

(5b) Next, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 63.7 μm,
"minimum pore size": 7.1 μm, and
"maximum pore size": 144.6 μm.

(5c) A carded web (70 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet.

(5d) Two pieces of the spunlace nonwoven fabric of the foregoing step (5a) were stacked, and two pieces of the spunlace nonwoven fabric of the foregoing step (5b) were further stacked thereon to form an air outlet layer sheet. The air inlet layer sheet of the foregoing step (5c) was further laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 1.5 mm in thickness and 230 g/m² in weight, and had a "mean flow pore size," a "minimum pore size," and a "maximum pore size" as follows:
"mean flow pore size": 28.0 μm,
"minimum pore size": 2.5 μm, and
"maximum pore size": 59.2 μm.

Example 6

(6a) Initially, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 63.6 μm,
"minimum pore size": 7.1 μm, and
"maximum pore size": 144.6 μm.

(6b) Next, a cotton sheet having an areal fiber weight of 35 g/m² was prepared. This cotton sheet had a "mean flow pore size," a "minimum pore size," and a "maximum pore size" as follows:
"mean flow pore size": 56.6 μm,
"minimum pore size": 5.0 μm, and
"maximum pore size": 136.1 μm.

(6c) Next, a carded web (30 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 94.4 μm,
"minimum pore size": 6.2 μm, and
"maximum pore size": 178.0 μm.

(6d) A carded web (70 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet.

(6e) Two pieces of the spunlace nonwoven fabric of the foregoing step (6a) were stacked, the cotton sheet of the foregoing step (6b) was further stacked thereon, and the spunlace nonwoven fabric of the foregoing step (6c) was further stacked thereon to form an air outlet layer sheet. Subsequently, the air inlet layer sheet of the foregoing step (6c) was further laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 45 g/m² in dry weight, and dried to obtain an air filter material. The resulting air filter material was 1.6 mm in thickness and 240 g/m² in weight, and had a "mean flow pore size," a "minimum pore size," and a "maximum pore size", as follows:

"mean flow pore size": 30.4 μm,
"minimum pore size": 2.9 μm, and
"maximum pore size": 64.8 μm.

Example 7

(7a) Initially, a carded web (60 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 40.2 μm,
"minimum pore size": 5.0 μm, and
"maximum pore size": 91.9 μm.
(7b) Next, a carded web (60 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 48.8 μm,
"minimum pore size": 7.9 μm, and
"maximum pore size": 97.6 μm.
(7c) A carded web (70 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Teijin Fiber Co., Ltd.) was created, and was made into nonwoven fabric by needle punching, thereby obtaining an air inlet layer sheet.
(7d) The spunlace nonwoven fabric of the foregoing step (7b) was stacked on the spunlace nonwoven fabric of the foregoing step (7a) to form an air outlet layer sheet. The air inlet layer sheet of the foregoing step (7c) was further laminated thereon and integrated by needle punching. The laminate integrated was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 1.6 mm in thickness and 230 g/m² in weight, and had a "mean flow pore size," a "minimum pore size," and a "maximum pore size" as follows:
"mean flow pore size": 32.2 μm,
"minimum pore size": 3.9 μm, and
"maximum pore size": 76.4 μm.

Comparative Example 1

(10a) Initially, a carded web (30 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 94.4 μm,
"minimum pore size": 6.2 μm, and
"maximum pore size": 178.0 μm.
(10b) A carded web (100 g/m² in areal fiber weight) containing 11.0-dT polyester staple (51 mm in length, from Kuraray Co., Ltd.) was created, and was made into nonwoven fabric by needle punching, thereby obtaining an air inlet layer sheet.
(10c) Five pieces of the spunlace nonwoven fabric of the foregoing step (10a) were stacked to form an air outlet layer sheet, and the air inlet layer sheet of the foregoing step (10b) was further laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 2.2 mm in thickness and 260 g/m² in weight, and had a "mean flow pore size," a "minimum pore size," and a "maximum pore size" as follows:
"mean flow pore size": 34.5 μm,
"minimum pore size": 4.2 μm, and
"maximum pore size": 75.0 μm.

Comparative Example 2

(20a) Initially, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 63.6 μm,
"minimum pore size": 7.1 μm, and
"maximum pore size": 144.6 μm.
(20b) Next, a carded web (60 g/m² in areal fiber weight) containing 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
"mean flow pore size": 48.8 μm,
"minimum pore size": 7.9 μm, and
"maximum pore size": 97.6 μm.
(20c) A carded web (85 g/m² in areal fiber weight) containing 6.7-dT polyester staple (51 mm in length, from Kuraray Co., Ltd.) was created, and was made into nonwoven fabric by needle punching, thereby obtaining an air inlet layer sheet.
(20d) The spunlace nonwoven fabric of the foregoing step (20b) was stacked on the spunlace nonwoven fabric of the foregoing step (20a) to form an air outlet layer sheet. The air inlet layer sheet of the foregoing step (20c) was further laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1 of Mirbane LC10 (from Showa Highpolymer Co., Ltd.), and 78.9% of water). The resin was adhered through a rubber mangle at a rate of 40 g/m² in dry weight, and dried to obtain an air filter material. The resulting air filter material was 1.7 mm in thickness and 215 g/m² in weight, and had a "mean flow pore size," a "minimum pore size," and a "maximum pore size" as follows:
"mean flow pore size": 40.5 μm,
"minimum pore size": 4.8 μm, and
"maximum pore size": 81.3 μm.

Comparative Example 3

(30a) Initially, a carded web (30 g/m² in areal fiber weight) containing 30 parts by weight of 0.9-dT polyester staple (51 mm in length, from Teijin Fiber Co., Ltd.) and 70 parts by weight of 1.6-dT polyester staple (51 mm in length, from Teijin Fiber Co., Ltd.) was created, and was made into spunlace nonwoven fabric by hydroentangling. The resulting spunlace nonwoven fabric had a "mean flow pore size," a "minimum pore size," and a "maximum pore size" as follows:
 "mean flow pore size": 63.6 μm,
 "minimum pore size": 7.1 μm, and
 "maximum pore size": 144.6 μm.
(30b) A carded web (50 g/m² in areal fiber weight) containing 50 parts by weight of 3.3-dT polyester staple (51 mm in length, from Teijin Fiber Co., Ltd.) and 50 parts by weight of 6.7-dT polyester staple (51 mm in length, from Kuraray Co., Ltd.) was created, and was made into nonwoven fabric by needle punching, thereby obtaining an air inlet layer sheet.
(30c) Four pieces of the spunlace nonwoven fabric of the foregoing step (30a) were stacked to form an air outlet layer sheet, and the air inlet layer sheet of the foregoing step (30b) was laminated thereon and integrated by needle punching. The resulting laminate was immersed into a binder resin solution (20% of Boncoat AN170 (from Dainippon Ink and Chemicals, Inc.), 1% of Mirbane SM300 (from Showa Highpolymer Co., Ltd.), 0.1% of Mirbane LC10 (from Showa Highpolymer Co., Ltd.), and 78.9% of water). The resin was adhered through a rubber mangle at a rate of 50 g/m² in dry weight, and dried to obtain an air filter material. The resulting air filter material was 1.4 mm in thickness and 220 g/m² in weight, and had a "mean flow pore size," a "minimum pore size," and a "maximum pore size" as follows:
 "mean flow pore size": 27.9 μm,
 "minimum pore size": 2.9 μm, and
 "maximum pore size": 63.9 μm.
(Evaluation)

The air filter materials fabricated in examples 1 to 7 and comparative examples 1 to 3 were measured for initial flow resistance (Pa), initial cleaning efficiency (%), full-life cleaning efficiency (%: when ΔP=0.98 kPa), and life (g: when ΔP=0.98 kPa) against JIS class 8 dust in accordance with JIS D-1612 (test methods of air cleaners for automobiles). Table 1 shows the results obtained.

The air filter materials were also made into filter elements, and evaluated for filter capabilities against JIS class 8 dust and carbon soot. Dust permeability was measured by a method of loading JIS class 8 dust up to ΔP=2.94 kPa and then passing air at a flow rate of 20 m³/min for 30 minutes under the application of a pulsating frequency of 200 Hz, followed by permeability calculation. Similarly, the air filter materials were measured for initial flow resistance (kPa), full-life cleaning efficiency (%), and life (g) against carbon soot (light-oil combustion carbon soot, 0.04 g/m³ in concentration, 20 m/min in flow rate). Tables 2 to 4 show the results obtained. Here, the full life was set to ΔP=2.94 kPa.

It should be noted that an initial flow resistance practically allowable for automobile air cleaners is lower than or equal to 1.9 kPa. The cleaning efficiencies are desirably as close to 100% as possible both in the initial stage and at full life. In particular, it is desired that the initial cleaning efficiency against JIS class 8 dust be higher than or equal to 98.5%, and the life be practically higher than or equal to 105 g. The smaller value the dust permeability has, the smaller dust permeation it indicates. The target value is lower than or equal to 1.5%.

TABLE 1

|  | Example | | | | | | | Comp. Example | | |
|  | 1 | 2 | 3 | 4 | 5 | 6 | 7 | 1 | 2 | 3 |
|---|---|---|---|---|---|---|---|---|---|---|
| Initial flow resistance (Pa) | 64 | 63 | 78 | 90 | 91 | 90 | 81 | 78 | 60 | 92 |
| Initial cleaning efficiency (%) | 97.0 | 98.0 | 98.1 | 98.0 | 98.4 | 98.3 | 98.2 | 98.3 | 97.0 | 98.2 |
| Full-life cleaning efficiency (%) | 98.6 | 98.7 | 99.0 | 99.1 | 99.4 | 99.2 | 98.8 | 99.3 | 98.0 | 99.2 |
| Life (g) | 15.6 | 15.9 | 16.5 | 9.9 | 9.8 | 9.8 | 11.0 | 14.2 | 18.4 | 9.6 |

TABLE 2

|  | Example 1 | | Example 2 | | Example 3 | |
|  | JIS class 8 | Carbon soot | JIS class 8 | Carbon soot | JIS class 8 | Carbon soot |
|---|---|---|---|---|---|---|
| Initial cleaning efficiency (%) | 98.9 | 85.7 | 98.9 | 83.7 | 99.5 | 88.3 |
| Full-life cleaning efficiency (%) | 99.2 | — | 99.2 | — | 99.6 | — |
| Life (g) | 119 | 3.5 | 106 | 4.0 | 106 | 3.8 |
| Dust permeability (%) | 1.04 | — | 1.06 | — | 0.24 | — |
| Initial flow resistance (kPa) | 1.80 | | 1.80 | | 1.85 | |

TABLE 3

|  | Example 4 | | Example 5 | | Example 6 | | Example 7 | |
|  | JIS class 8 | Carbon soot | JIS class 8 | Carbon soot | JIS class 8 | Carbon soot | JIS class 8 | Carbon soot |
|---|---|---|---|---|---|---|---|---|
| Initial cleaning efficiency (%) | 99.2 | 86.0 | 99.4 | 86.5 | 99.1 | 83.0 | 99.0 | 85.2 |
| Full-life cleaning efficiency (%) | 99.5 | — | 99.7 | — | 99.6 | — | 99.3 | — |

TABLE 3-continued

|  | Example 4 | | Example 5 | | Example 6 | | Example 7 | |
| --- | --- | --- | --- | --- | --- | --- | --- | --- |
|  | JIS class 8 | Carbon soot | JIS class 8 | Carbon soot | JIS class 8 | Carbon soot | JIS class 8 | Carbon soot |
| Life (g) | 140 | 3.2 | 110 | 3.4 | 115 | 3.5 | 110 | 3.8 |
| Dust permeability (%) | 0.48 | — | 0.22 | — | 0.50 | — | 1.10 | — |
| Initial flow resistance (kPa) | 1.85 | | 1.85 | | 1.84 | | 1.85 | |

TABLE 4

|  | Comparative Example 1 | | Comparative Example 2 | | Comparative Example 3 | |
| --- | --- | --- | --- | --- | --- | --- |
|  | JIS class 8 | Carbon soot | JIS class 8 | Carbon soot | JIS class 8 | Carbon soot |
| Initial cleaning efficiency (%) | 99.2 | 88.4 | 98.2 | 79.4 | 99.2 | 85.9 |
| Full-life cleaning efficiency (%) | 99.6 | — | 98.9 | — | 99.6 | — |
| Life (g) | 137 | 3.5 | 136 | 3.2 | 98 | 3.1 |
| Dust permeability (%) | 0.32 | — | 1.80 | — | 0.51 | — |
| Initial flow resistance (kPa) | 2.1 | | 1.75 | | 1.80 | |

As can be seen from Tables 1 to 4, the filter elements made of the air filter materials of examples 1 to 7, or practical examples of the invention, have excellent capabilities against JIS class 8 dust and carbon soot in terms of the initial cleaning efficiency and the full-life cleaning efficiency. They are also excellent in terms of initial flow resistance, dust permeability, life, etc., exhibiting filter capabilities in a well-balanced manner.

In contrast, comparative example 1 has the disadvantage that while the spunlace nonwoven fabric constituting the air outlet layer sheet has a relatively large mean flow pore size, the resulting air filter material itself is too small in pore sizes and thus the initial flow resistance of the air filter material is too high. In the case of comparative example 2, part of the spunlace nonwoven fabrics constituting the air outlet layer sheet has a relatively small mean flow pore size while the resulting air filter itself is too large in all the mean flow pore size, the minimum pore size, and the maximum pore size. Thus, there is a disadvantage that the air filter material has an excessive dust permeability against JIS class 8 dust. Moreover, in the case of comparative example 3, the air inlet layer is so small in areal fiber weight that it fails to provide a volume expected of the air inlet layer. The insufficient volume shortens the life of the air filter material.

The air filter materials according to the present invention have an excellent initial flow resistance, life, dust permeability, and dust penetration resistance, and exhibit a predetermined or higher level of carbon soot collection capability as well. They can be suitably used as filter elements of air cleaners for various types of internal combustion engines that run on gasoline, ethanol, light oil, heavy oil, and other fuels, including four-stroke and two-stroke reciprocating engines, rotary engines, and gas turbine engines, or air filters for automotive vehicles (such as a motorcycle and a four-wheel car) in particular, and thus are useful as low-profile air filter materials.

What is claimed is:

1. An air filter material for an air cleaner for an automobile engine, the air filter material comprising:
    a laminate of an air inlet layer and an air outlet layer, having a mean flow pore size of 20 μm to 40 μm, a minimum pore size of 2.4 μm to 3.8 μm, and a maximum pore size of 80 μm or less,
    wherein:
       the air inlet layer is a needle punched nonwoven fabric layer having an areal fiber weight of 65 g/m$^2$ to 90 g/m$^2$,
       the air outlet layer is a laminated spunlace nonwoven fabric formed by laminating at least two or more spunlace nonwoven fabric layers having an areal fiber weight of 30 g/m$^2$ to 40 g/m$^2$, a mean flow pore size of 50 μm to 75 μm, a minimum pore size of 4.0 μm to 8.0 μm, and a maximum pore size of 150 μm or less, and
       the air filter material has a thickness of 1.5 mm to 1.9 mm.

2. The air filter material according to claim 1, further comprising a cotton layer having an areal fiber weight of 20 g/m$^2$ to 60 g/m$^2$, the cotton layer being interposed between the air outlet layer and the air inlet layer, or between any two of the spunlace layers that constitute the air outlet layer.

3. The air filter material according to claim 2, wherein the cotton layer has an areal fiber weight of 30 g/m$^2$ to 40 g/m$^2$, a mean flow pore size of 50 μm to 80 μm, a minimum pore size of 4 μm to 8 μm, and a maximum pore size of 150 μm or less.

4. The air filter material according to claim 1, further comprising viscous oil applied to a surface of an air inlet side of the air filter material.

5. The air filter material according to claim 1, wherein the air outlet layer and the air inlet layer are laminated in direct contact with each other.

6. The air filter material according to claim 1, containing a binder resin in an amount of 15 g/m$^2$ to 60 g/m$^2$.

7. The air filter material according to claim 6, containing the binder resin in an amount of 20 g/m$^2$ to 50 g/m$^2$.

8. The air filter material according to claim 1, the air outlet layer being a laminated spunlace nonwoven fabric formed by laminating at least three or more spunlace nonwoven layers.

9. An air filter material for an air cleaner for an automobile engine, the air filter material comprising:
    a laminate of an air inlet layer and an air outlet layer, having a mean flow pore size of 20 μm to 40 μm, a minimum pore size of 2.4 μm to 3.8 μm, and a maximum pore size of 80 μm or less,
    wherein:
       the air inlet layer is a needle punched nonwoven fabric layer having an areal fiber weight of 65 g/m$^2$ to 90 g/m$^2$, the air outlet layer is a laminated spunlace nonwoven fabric formed by laminating at least two or more spunlace nonwoven fabric layers having an areal fiber weight of 30 g/m² to 40 g/m², a mean flow pore size of 50 μm to 75 μm, a minimum pore size of 4.0 μm to 8.0 μm, and a maximum pore size of 150 μm or less, fibers making up the at least two or more spunlace nonwoven fabric layers having a diameter of 0.6 dT to 1.6 dT, and the air filter material has a thickness of 1.5 mm to 1.9 mm.

* * * * *

UNITED STATES PATENT AND TRADEMARK OFFICE
CERTIFICATE OF CORRECTION

| | | |
|---|---|---|
| PATENT NO. | : 7,968,176 B2 | Page 1 of 1 |
| APPLICATION NO. | : 11/822110 | |
| DATED | : June 28, 2011 | |
| INVENTOR(S) | : Norio Umezu et al. | |

It is certified that error appears in the above-identified patent and that said Letters Patent is hereby corrected as shown below:

Title page, item [65] add the following information

Prior Application Data

This application is a CIP of PCT/JP2006/318291 filed 09/14/2006.

Signed and Sealed this
Thirty-first Day of January, 2012

David J. Kappos
*Director of the United States Patent and Trademark Office*